United States Patent
Linburn et al.

(10) Patent No.: US 8,005,316 B1
(45) Date of Patent: Aug. 23, 2011

(54) SYSTEM AND METHOD FOR EDITING IMAGE DATA FOR MEDIA REPURPOSING

(75) Inventors: Carol Linburn, San Francisco, CA (US); Winston L. Wang, Santa Clara, CA (US); Simon Hayhurst, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1114 days.

(21) Appl. No.: 11/749,565

(22) Filed: May 16, 2007

(51) Int. Cl.
*G06K 9/20* (2006.01)
*G09G 5/00* (2006.01)

(52) U.S. Cl. .......................................... 382/283; 345/1.1
(58) Field of Classification Search ................... 382/283
See application file for complete search history.

(56) References Cited

U.S. PATENT DOCUMENTS

| | | | |
|---|---|---|---|
| 6,621,524 B1* | 9/2003 | Iijima et al. | 348/584 |
| 6,759,996 B1* | 7/2004 | Someya et al. | 345/1.1 |
| 6,822,637 B2* | 11/2004 | Someya | 345/157 |
| 6,862,005 B2* | 3/2005 | Someya | 345/1.1 |
| 6,988,249 B1* | 1/2006 | Arvanitis et al. | 715/853 |
| 7,161,557 B2* | 1/2007 | Thornton | 345/2.1 |
| 7,304,677 B2 | 12/2007 | Keelan et al. | |
| 7,446,731 B2* | 11/2008 | Yoon | 345/2.2 |
| 7,545,958 B2 | 6/2009 | Ohmura et al. | |
| 2008/0019574 A1* | 1/2008 | Scalise et al. | 382/118 |
| 2008/0019575 A1* | 1/2008 | Scalise et al. | 382/118 |

OTHER PUBLICATIONS

U.S. Appl. No. 11/747,012 by Linburn et al.
Non-Final Office Action mailed Feb. 3, 2010 in U.S. Appl. No. 11/747,012.
Applicant's Remarks dated May 3, 2010 in response to Feb. 3, 2010 Non-Final Office Action in U.S. Appl. No. 11/747,012.

* cited by examiner

*Primary Examiner* — David P Zarka
(74) *Attorney, Agent, or Firm* — Kilpatrick Townsend & Stockton LLP

(57) ABSTRACT

The present invention is directed to a system and method which allow for the automatic cropping and file generation of images from an existing image for display on multiple devices. An image, such as a video image, is provided to an Integrated Development Environment (IDE). Next a mask or plurality of masks representative of different displays are applied to the image. The mask can be moved such that the content author can display an area of interest in the desired device. Once the mask is in place a crop is generated based on the mask. As frames are advanced the mask may be moved as the area of interest moves. Again a crop is made based on the mask. Once completed a file of the images is generated for each device represented by the mask that is displayable for the device.

18 Claims, 12 Drawing Sheets

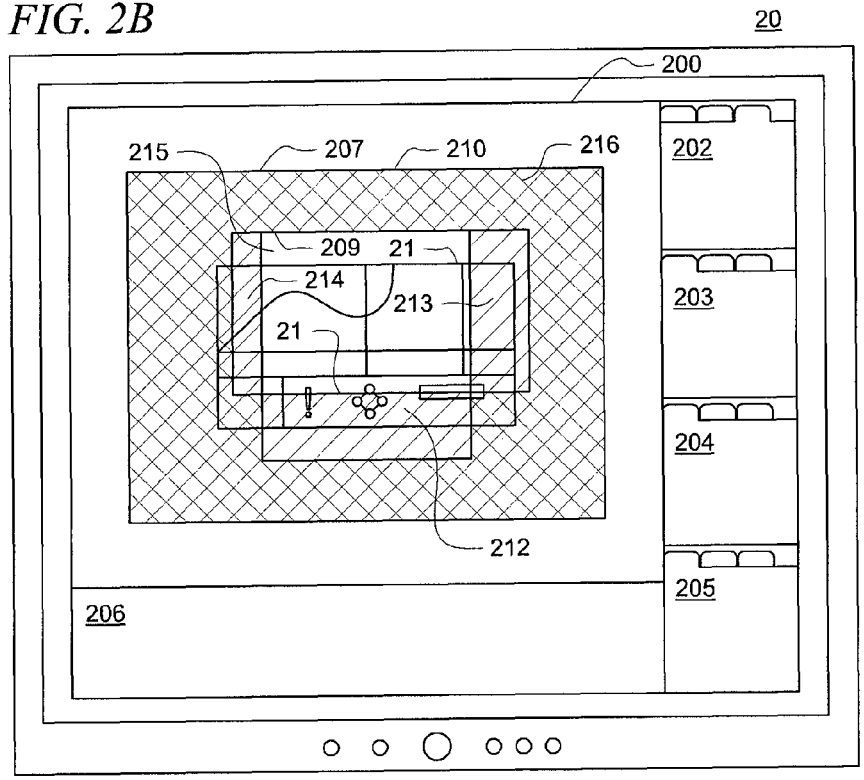
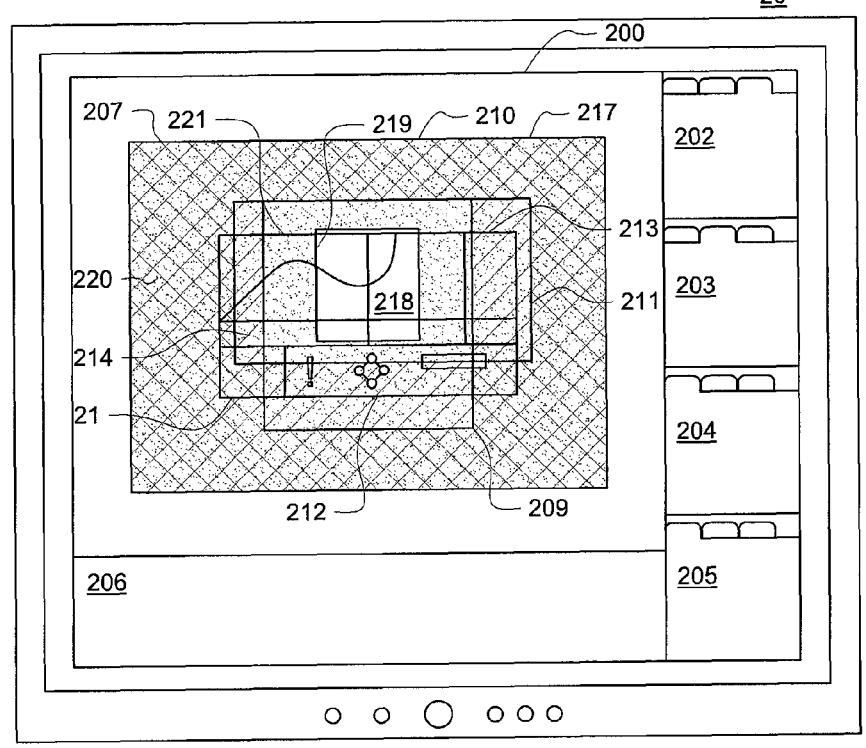

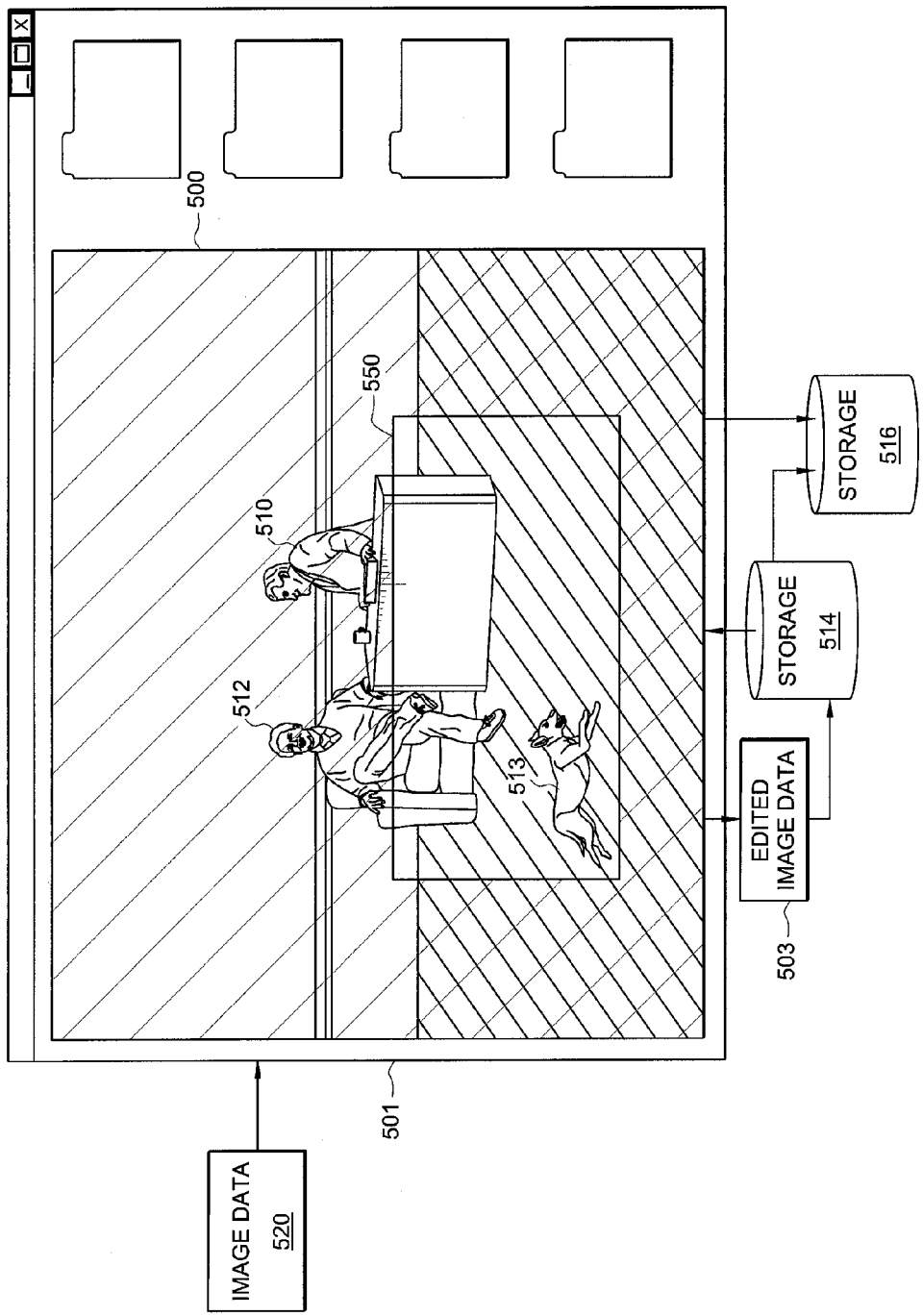

SYSTEM AND METHOD FOR EDITING IMAGE DATA FOR MEDIA REPURPOSING

CROSS-REFERENCE TO RELATED APPLICATIONS

This application is related to co-pending and commonly assigned U.S. patent application Ser. No. 11/512,567, filed Aug. 30, 2006, entitled "IDENTIFICATION OF COMMON VISIBLE REGIONS IN PURPOSING MEDIA FOR TARGETED USE", the disclosure of which is hereby incorporated herein by reference.

TECHNICAL FIELD

The present invention relates, in general, to media development environments, and, more specifically, to editing image data for media repurposing.

BACKGROUND OF THE INVENTION

In today's information-driven world, it is often desirable to present information in various different media. "Media" or "medium" as used herein, refers to any mechanism for presenting content. Examples of media include non-electronic media such as paper, etc on which content may be presented (e.g., content may be printed, painted, or otherwise presented on such non-electronic media). A further example of media includes electronic media, such as electronic devices operable to display content stored on a computer readable medium, etc. Content refers to any type of information that may be present on a media, such as images (still, moving, video, etc), text, etc.

Content created by a content author, such as a designer, developer, programmer, graphic artist, and the like, may be created specifically for presentation on multiple different devices or in multiple different formats. These different displays and formats may have several different presentation variables, such as display size, aspect ratio, resolution, size, pixel shape and size, and the like. The content author would generally create, reshape, or recreate the content for each different targeted format.

Content may also have been originally created for print or for traditional broadcast media or used in print, but later thought to be useful for use or presentation in different ways, such as on a computer screen, mobile phone screen, electronic time varying display, or the like. In creating this print content, it may have been created or printed specifically for a certain size, such as letter size. However, it may also be useful for presentation on postcard-size paper, A4 paper, PAL, NTSC, or the like, or in a different media type entirely, such as on a standard computer screen, mobile phone, electronic time varying display, or the like. In order to repurpose this content, content authors typically reshape or reformat the original layout to meet the size or layout restrictions of the new, targeted use, device, or media type. This process is significantly compounded when repurposing video as thousands of individual frames must be considered.

Creation and modification of such content is typically accomplished using computers and graphics design or page layout applications, such as Adobe Systems Incorporated's ACROBAT®, PAGEMAKER®, ILLUSTRATOR®, FREEHAND®, FRAMEMAKER®, FLASH®, AFTER EFFECTS®, PREMIERE PRO®, DREAMWEAVER®, GOLIVE®, Microsoft Corporation's FRONTPAGE®, and the like. The user generally creates, copies, opens, or scans the content into the development area and graphically generates or manipulates the content and layout to fit the desired target size or specific media presentation aspect for the targeted use. For example, if a company desires to create marketing pamphlets in various paper sizes and also for display on its websites, the author would create the graphics and other content for the pamphlet in an Integrated Development Environment (IDE), such as one of the design applications noted above, and then manipulate the graphics of the pamphlet to make it fit onto the desired target size or device in a pleasing or logical manner. Similar approaches are made when using or converting vide images. The author would generally use multiple editing sessions resulting in multiple files to accommodate all of the intended target formats. The resulting content would then be printed, stored, or placed into whatever other kind of medium or format for which it was intended.

Another relevant example is the purposing, i.e., creation or repurposing, of content for electronic devices, including personal computers (PCs), and mobile electronic devices, such as mobile phones, personal digital assistants (PDAs), portable media devices, such as Apple Computer Inc.'s IPOD®, Creative Technology Ltd.'s ZEN VISION™, iRiver Inc.'s CLIX™, and the like. As these electronic devices become more rich media capable, they become a natural place to consume time varying, interactive, and rich media information. Therefore, content authors are involved in creating new and repurposing existing content specifically for certain target electronic devices, such as target mobile electronic devices. Typically, content authors will make decisions on the layout, presentation, or format of information on a per device basis. With so many devices having multiple different presentation variables (e.g., different display sizes, etc.), there is a considerable amount of time designing and then fitting the designed content for multiple devices.

The wide variety of aspect ratios and resolutions available across various media today, and, in particular, across mobile phones and other mobile devices creates an enormous number of variations for any content that is intended to reach multiple media devices. Because a developer purposing content for multiple media devices would generally create several hundred different variations of the content, content creation and repurposing is a very repetitive process that can be very tedious and time consuming. The potential costs to purposing content may, therefore, limit the amount of such authoring that is done and, as a result, reduce the potential benefit that new consumers may have in using content in multiple, different media. Moreover, the time constraints involved in bringing content to the market may result in coarse design decisions being made which may produce an inconsistent quality of information and content display. This approach to handling many target formats authors typically make single sets of decisions for multiple target devices. Such coarsely designed content may be too large or too small for a useful or pleasant user experience.

BRIEF SUMMARY OF THE INVENTION

The present invention and its various representative embodiments are directed to systems, methods and computer program products that provide editing tools for content authors to use the various purposing masks to edit image data for media repurposing. Further, features of the present invention allow for the automatic cropping (or other manipulations) and file generation of images from an existing image for display on multiple different media or media types.

Briefly, as disclosed in co-pending, commonly assigned U.S. patent application Ser. No. 11/512,567, entitled "IDENTIFICATION OF COMMON VISIBLE REGIONS IN PUR- POSING MEDIA FOR TARGETED USE". A content author may begin the design process by electronically sketching the content in a development environment. A content author typically makes creative decisions with a specific format in mind. For example, in order to make the design process more efficient, the author may use a mask that allows him or her to see the visual dimensions of the various presentation variables for the target media. The author will either create a mask or use a pre-built mask for each mobile device with a separate mask for each device having different presentation variables. The mask is then used as a layer over the content. Part of the mask is typically translucent or opaque, which represents the space outside of the usable display space on the mobile device. A portion in the center of the mask typically shows the visible space available on the device. In this manner, when the user lays the mask over the content, he or she is able to see what will generally be viewable by a person using that particular mobile device. Any part of the content that ends up behind the translucent or opaque section will be content that a user of that particular device would not typically be able to see. The developer may then make the necessary modifications to the content design to fit into the visible display area. Typically, the user either changes the content to make it fit the mask, or changes the crop/mask area on top of the content.

In order to keep track of the various masks and the associated formats that each mask represents, the user or developer typically relies on memory or customized names of either the mask or the layer in which the mask is placed. When working to purpose information into only a few different target formats, the ability to keep track of which masks represent the various target formats is relatively straight forward. However, when dealing with the purposing of information into tens or even hundreds of different target formats, keeping track of the various masks is extremely complicated, if not impossible in a single purposing session. A considerable amount of time is lost by repeating the purposing process with manageable groups of masks. This time expense would likely affect how many target formats are used for content to be purposed into. Thus, reducing the potential reach of information. Further, many times the same purposing mask represents a number of different devices that use different file formats. Thus in order to create the file for each device the author would have to generate the correct file format for each device separately, The present invention is directed to a system and method which allow for the automatic cropping and file generation of images from an existing image for display on multiple devices. An image, such as a video image, is provided to an Integrated Development Environment (IDE). Next a mask or plurality of masks representative of different displays are applied to the image. The mask can be moved such that the content author can display an area of interest in the desired device. Once the mask is in place a crop is generated based on the mask. For content that comprises multiple frames (e.g. video data), as frames are advanced the mask may be moved as the area of interest moves. Again a crop is made based on the mask. Once completed an edited file of the content is generated for each target device represented by the mask.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 2B shows a screenshot illustrating the content purposing system configured according to one embodiment of the present invention having added a purposing mask;

FIG. 2C shows a screenshot illustrating the content purposing system configured according to one embodiment of the present invention having added another purposing mask;

FIGS. 5A-5H show screen shots illustrating the placement and movement of purposing masks according to embodiments of the present invention.

DETAILED DESCRIPTION OF THE INVENTION

Figure 1:
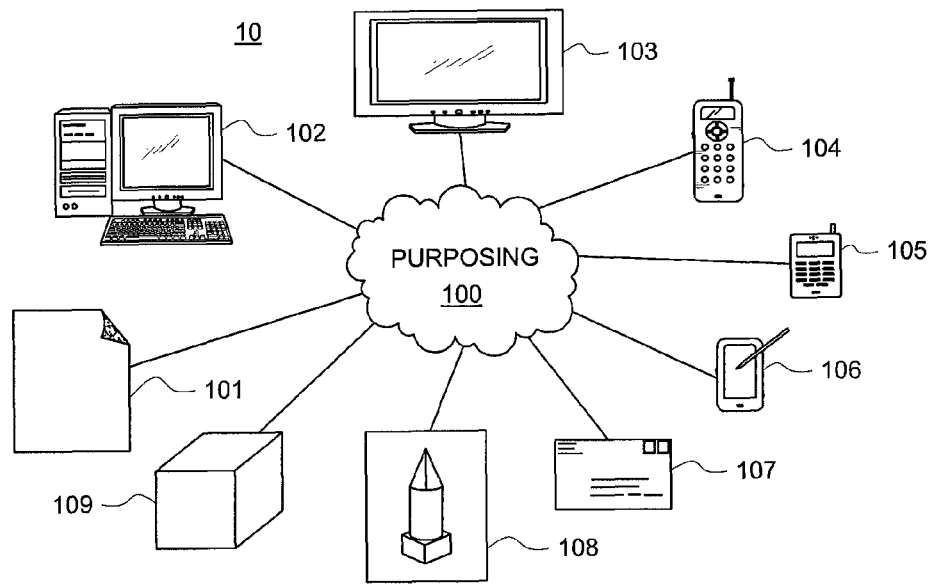
FIG. 1 shows a block diagram illustrating a content purposing lifecycle.

FIG. 1 shows a block diagram illustrating content purposing lifecycle 10. Content takes on many different forms and is represented in many different media or target formats. Such content may be presented on various media, such as print media, such as page 101 or postcard 107; computer media, such as computer 102, which may be electronic images or a complex Rich Internet Application (RIA); television content, such as the content displayed on television 103; mobile device content, which may be displayed on mobile phones 104-105 and PDA 106; three-dimensional content, such as hologram image 108 and block sculpture 109. Content, thus, is any type of information that is eventually presented in a physical or sensory manner, whether through electronic devices or non-electronic devices (e.g. physical material). As used herein below, medium (media or other derivation) refers to the device upon which the content is presented to a user.

In exemplary operation, a content author desires to create content for mobile phones 104 and 105 and also for PDA 106. Instead of working with three different content files that are specifically targeted for each of the devices, the content author selects to display masks representing mobile phones 104 and 105 and PDA 106 on to the design area of an IDE implementing content purposing process 100. For example, one such mask may provide a shaded region surrounding a clear region that represents the viewable area on the display of mobile phone 104, while the other masks provide similar transparent and translucent regions representing the viewable areas on mobile phone 105 and PDA 106. With each of the mask's transparent region intersecting into a common transparent region, the author may create the content to fit within the visible display areas of each of mobile phones 104 and 105 and PDA 106 by drafting the content within that common transparent region. Optionally, the content author may choose to include the majority of the content in the common transparent region, but allow some of the content to enter the overlapped translucent regions of selected ones of the target devices. For example, the author may design the content to fit squarely within the visible region of PDA 106, but allow some of the content to extend into the translucent regions of mobile phones 104 and 105. This extending of the content beyond the visible screen region of mobile phones 104 and 105 may require the user of those mobile phones to use a scrolling function to view the entire content.

Use of such masks and exemplary development applications that provide the masks are described in more detail in co-pending, commonly assigned, U.S. patent application Ser. No. 11/512,567, entitled "IDENTIFICATION OF COMMON VISIBLE REGIONS IN PURPOSING MEDIA FOR TARGETED USE", the disclosure of which is hereby incorporated by reference in its entirety. Thus, according to certain embodiments of the present invention masks may be provided into the IDE.

During the purposing process the user may desire to view information corresponding to a mask or group of masks that are present in the IDE This information may include information such as devices associated with the mask, demographic information related to the users associated with the devices, etc. This information can be used by the user in making decisions and/or understanding the impact a particular purposing operation may have on the viewers of the media.

In purposing content for mobile devices, such as mobile phones 104-105, several mobile phone displays may share the same or similar sizing requirements. Thus, purposing content for 20 different mobile phones may not require the creation of 20 differently-sized pieces of content. A few differently-sized files may be used to provide content to all 20 or more mobile device displays.

In other circumstances, there may be content that is originally presented in a first medium that a content author desires to purpose for use in new medium. For example, if a content author desires to purpose the graphics content of a computer application that runs on computer 102 to adequately display on mobile phones 104-105 and PDA 106, he or she may use content purposing process 100 to crop, modify, and the like, the graphics content and user interface (UI) graphics to fit onto the screens of mobile phones 104-105 and PDA 106. In content purposing process 100, which is configured according to one embodiment of the present invention, the author may display the application graphics onto a design screen and select multiple purposing masks that were generated to show what portion of the application graphics will fit in the viewing area of the particular mobile device. The user of the development system may select to layer this purposing mask on top of the application graphics. Any of the graphics that remain visible through the transparent region would, therefore, be visible when presented on mobile phone 104. The user then either modifies, crops, or performs any other such editing on the images to accommodate the display size of mobile phone 104.

Additionally, the user could select to layer purposing masks that show the visible screen area for mobile phone 105 and PDA 106 on top of the mask representing the visible area of mobile phone 104. In this process, the user can see the visible display area that is common to all of mobile phones 104-105 and PDA 106. If the user desires to make a single content (e.g. application) that will be viewable on each of mobile phones 104-105 and PDA 106, he or she could then crop or modify the content (e.g. application and UI graphics), or copies thereof, to fit in the common visible regions. In other approaches the user may make decisions that are optimal on one device and acceptable on other devices. For example, the user can choose a well framed shot on the phone with the largest field of view, but still have both full heads framed on those with narrower frames.

Content purposing may also be conducted in three-dimensions (3D) with physical items, such as block sculpture 109. Purposing 3D content may comprise representing the content in another target 3D media, such as another physical item, a holographic image, an orthographic projection, or some other kind of 3D perspective projection. In operation, a content author may scan or draw an electronic, 3D representation of block sculpture 109 into an IDE that implements content purposing process 100. The content author may then select the type and size of target medium desired, and a purposing mask or masks that represent those selected target medium would be layered on top of the scanned or drawn content. In the described example, the content author desires to create a hologram and a postcard that includes the image of block sculpture 109. Masks for both target medium and presentation variables would be layered on top of the scanned or drawn image of block sculpture 109, with the part of the image visible through the intersection of the transparent portions of the masks being the common region visible in both target mediums. The user may then crop, modify, rescale, or perform some other type of editing of the image to fit the resulting content into the target medium, i.e., hologram image 108 and postcard 107.

It should be noted that content purposing process 100 may be used to purpose content for any target formats, either through creating new content or repurposing existing content. It should further be noted that when operating content purposing process 100 with 3D content, some 3D masks may be created from certain two-dimensional (2D) masks by extending the 2D mask into a 3D representation through an orthographic or other perspective projection.

When purposing content for some target forms of medium, such as electronic media (e.g., mobile devices), the target devices are not always uniform in display-size or resolution. Because there is no uniformity, multiple variations of purposed content are typically created in order to conform to each of the presentation variables of the various target devices, such as display size, aspect ratio, density, pixel shape, resolution, and the like. Alternatively, a content author could select to purpose content to a certain single set of presentation variables, but do so in such a fashion that would accommodate the most devices possible. In other words, fewer versions of the content may be created if one or more of the versions are created (or purposed) such that they are suitable for presentation on multiple different device types (e.g. having different presentation variables).

Figure 2A:
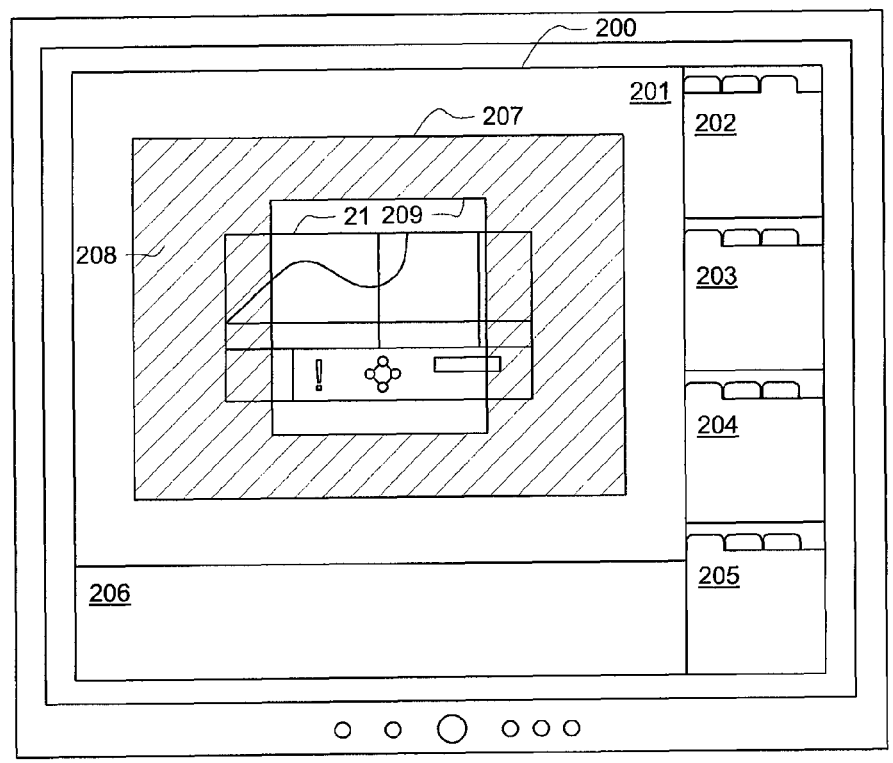
FIG. 2A shows a screenshot illustrating a content purposing system configured according to one embodiment of the present invention.

FIG. 2A is a screenshot illustrating content purposing system 20 configured according to one embodiment of the present invention. Content purposing system 20 is implemented through IDE 200. IDE 200 uses typical interface features, such as tool panels 202-205, property inspector 206, and design canvas 201. For purposes of this example, a content author desires to purpose content 21 from one media for use on devices 104-106 (FIG. 1). The author begins by placing content 21 onto design canvas 201. Using a pull-down menu or one of tool panels 202-205, the author selects to purpose content 21 to a mobile device and selects the actual mobile phone device model, such as a Motorola RAZR® which has a display size that has been associated with device group 104 (FIG. 1). Once selected, purposing mask 207, which represents device group 104, is layered on top of content 21. Purposing mask 207 provides translucent region 208 and transparent region 209 that represents the display dimensions and presentation variables of device group 104 (FIG. 1).

FIG. 2B is a screenshot illustrating content purposing system 20 configured according to one embodiment of the present invention having added purposing mask 210. After selecting purposing mask 207, the content author accesses the tools menu again to select the purposing mask that represents a mobile phone in device group 105 (FIG. 1), i.e., purposing mask 210. Purposing mask 210 is then layered on top of purposing mask 207 within IDE 200. Because device group 105 (FIG. 1) has a different display size and different presentation variables, transparent region 209 for purposing mask 207 is partially obscured by translucent region 216, which surrounds transparent region 211 representing the visible region of device group 105 (FIG. 1). The overlapping transparent regions produce common region 215. The part of underlying content 21 that shows through common region 215 is the part of content 21 that would be visible on both mobile phones 104 and 105 (FIG. 1). The overlapping translucent regions also provide the author with visible cues as to what portions of content 21 are commonly not visible, and what portions may be visible on one device group but not the other device group. Single overlap region 212 shows the content author that content 21, in this region, would not be visible on either device groups 104 and 105 (FIG. 1). Single overlap regions 213 and 214 show the content author that content 21, in this region, would not be visible on device group 105 (FIG. 1), but would be visible on device group 104 (FIG. 1). Thus, not only does common region 215 give the content author useful information regarding the visibility of content 21 on the target devices, but some of the translucent and overlapped areas also give the content author information that could be used to decide whether it is better to create a single piece of content that could be seen on each of the device groups, such as device groups 104 and 105 (FIG. 1), or to create multiple sizes for each one individually.

FIG. 2C is a screenshot illustrating content purposing system 20 configured according to one embodiment of the present invention having added purposing mask 217. After selecting purposing masks 207 and 210, the content author accesses the tools menu again to select the purposing mask that represents PDA 106 (FIG. 1), i.e., purposing mask 217. Purposing mask 217 is then laid on top of purposing masks 207 and 210 within IDE 200. Transparent region 219 represents the viewable display of PDA 106 (FIG. 1) and intersects with and partially obscures transparent regions 209 and 211 to create common region 218. Underlying content 21 visible through common region 218 represents the part of content 21 that would be seen on all mobile phones 104-105 and PDA 106 (FIG. 1).

Once the content author selects and overlays all of the desired purposing masks, he or she may either crop content 21 to fit within any one or all of transparent regions 209, 211, and 219, scale content 21 to fit more of its visual area with any one or all of transparent regions 209, 211, and 219, or modify content 21 to rearrange its component objects or parts to fit more of the interesting areas within any one or all of transparent regions 209, 211, and 219. Various different fitting edits may be used to modify the purposed content, such as cropping, scaling, shrinking (maintaining the same aspect ratio), non-linear scaling, clipping, extending, extrapolating, and the like.

It should be noted that in the embodiment of the present invention illustrated in FIGS. 2A, 2B, and 2C, translucent regions 209, 211, and 219 have varying degrees of translucency. In terms of graphic representation, the alpha channel level of the translucent regions is neither completely a zero nor 100%. Thus, as the translucent regions are layered on top of one another, the combined translucency becomes less or the alpha channel level moves toward 100%. This variation in combined translucency may assist the user in determining what part or parts of the content is visible in the transparent regions of the various purposing masks.

It should further be noted that in various additional and/or alternative embodiments of the present invention, the overlapped regions, such as single overlap regions 212-214, may be presented with specialized visible cues that prompt or inform the content author with regard to the meaning of the overlap. For example, translucent regions 209, 211, and 219 may use different translucent color hues, such that when an overlap occurs a completely different color is created by the combination of the overlapping colors of the overlapping translucent regions. Other visual indicators may also be used, such as adding texture or dimensional cues that draws visual attention to the overlapped regions.

In some embodiments, the content author can obtain demographic or other information about each of device groups 104, 105, and 106 represented by masks 209, 211 and 219. This information can be presented as a "pop-up" that appears when a pointer is hovered over the appropriate mask, or can be a graphical representation of the information. However, other indicators can be used. In one embodiment, the demographic information indicates to the content author the number of devices in a specific market are associated with the mask (i.e., the number of devices in the North American market).

Figure 3:
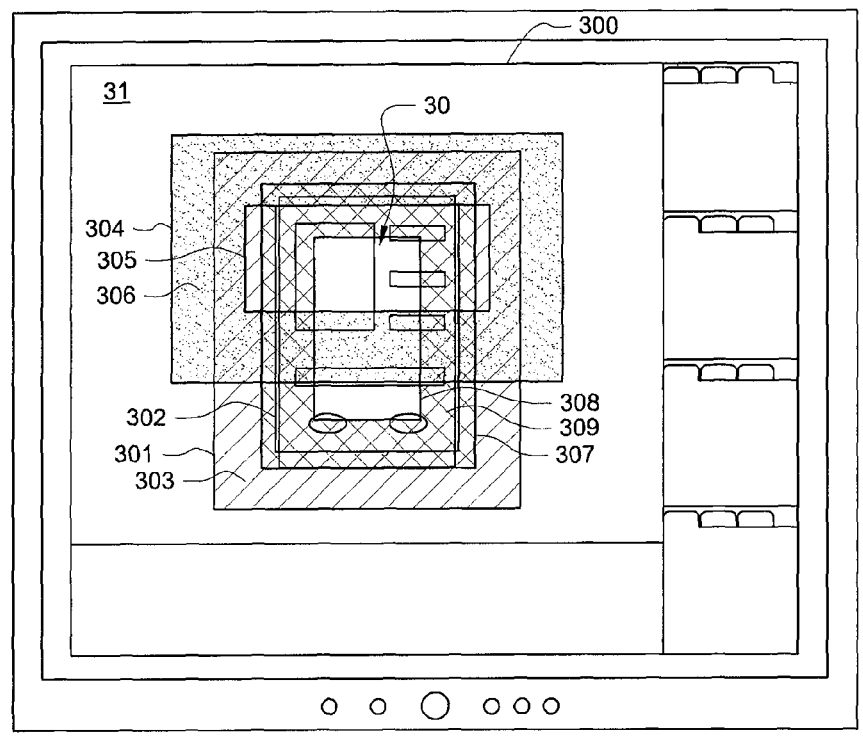
FIG. 3 shows a block diagram illustrating an IDE configured according to one embodiment of the present invention.

FIG. 3 is a block diagram illustrating IDE 300 configured according to one embodiment of the present invention. When creating content destined for presentation in multiple target media types or formats, the various target formats may have different presentation variables from other electronic formats. Depending on the display resolution of the specific target device, the appearance of the content will vary. In the embodiment of the present invention illustrated in FIG. 3, IDE 300 provides purposing masks that are normalized according to the resolution of the targeted format or device. Therefore, the size of the mask will vary depending on the resolution of the target media.

For example, IDE 300 displays content 30 within edit region 31. The user has selected three different masks, masks 301, 304, and 307, to overlay onto content 30. Each of masks 301, 304, and 307 is a different size, representing a different resolution of the associated target format or device. Transparent region 302 of purposing mask 301 is sized for a display with a resolution of 1280×1024 pixels. Transparent region 305 of mask 304 is sized for a display with a resolution of 1366×768 pixels. Transparent region 308 of mask 307 is sized for a display with a resolution of only 640×480. When comparing the actual physical size of the different electronic displays, their physical dimensions may not differ by that much. However, because their pixel size and/or number of pixels in the resolution may differ substantially, the appearance of the displayed content will change from display to display.

In IDE 300, the mask is normalized according to pixel size, which causes masks 301, 304, and 307 to be of different overall sizes. In comparison to the embodiment depicted in FIGS. 2A-C, purposing masks 207, 210, and 217 are normalized according to the size of the mask itself or design canvas 201 of IDE 200 leaving variations in the transparent regions to reflect the differences in the visible regions. It should be noted that in various embodiments of the present invention, an IDE may include a feature that allows the user to toggle between normalizing the mask size either according to pixel-size/resolution or to the design canvas size.

Figure 4:
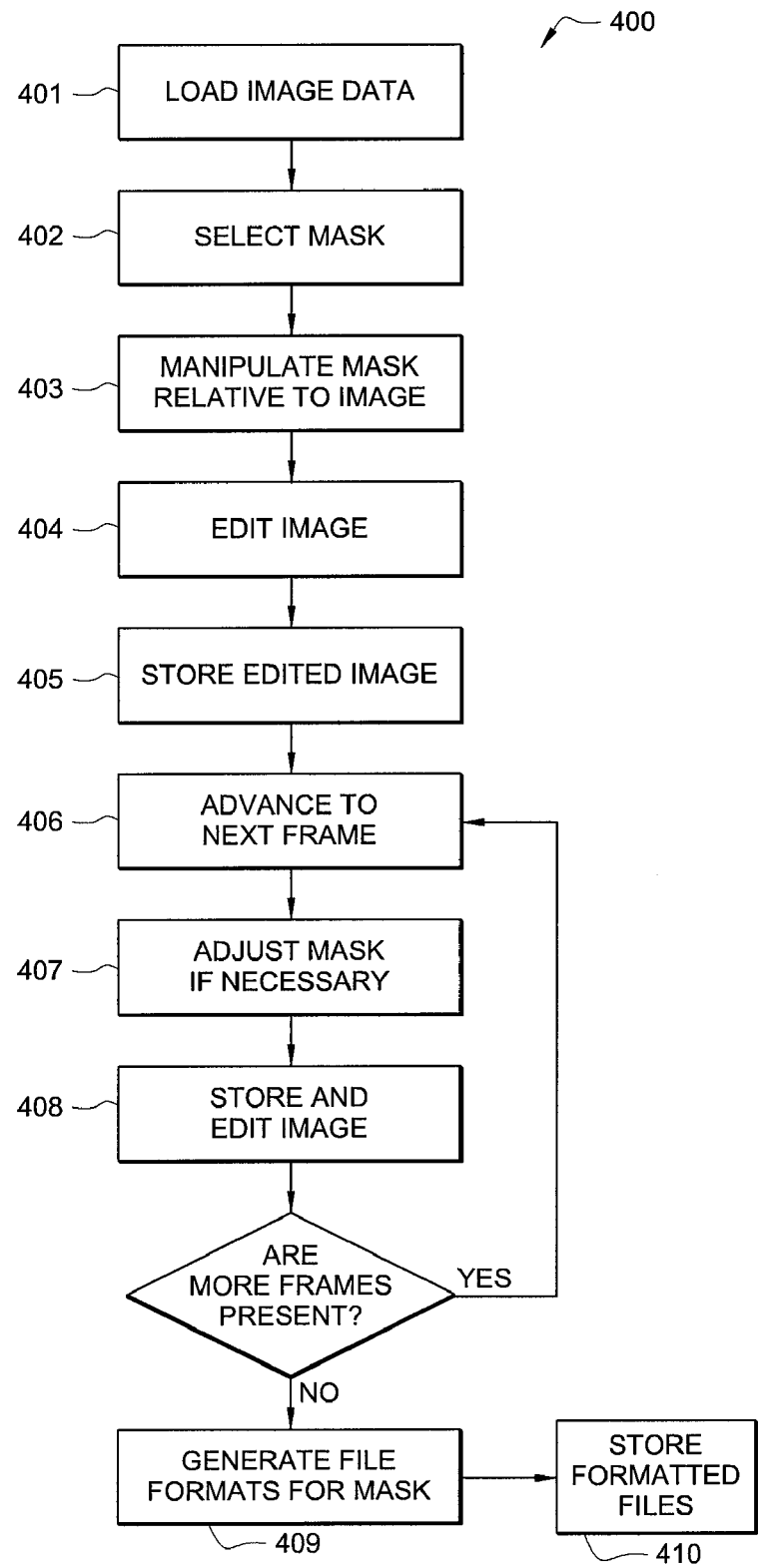
FIG. 4 shows a flowchart illustrating example steps executed to implement one embodiment of the present invention.

FIG. 4 is a flow diagram illustrating a process 400 for generating image content for devices according to one embodiment of the present invention. FIGS. 5A-5H are screenshots illustrating the placement of masks in different frames of a video image according to various embodiments of the present invention. For purposes of this discussion FIGS. 4 and 5A-5H will be discussed together.

At process 401 an image 500 that is to be converted to the various formats is loaded into the IDE of the present invention. In one embodiment, image 500 is loaded as image data 520. The image that is loaded may be a video image or a still image. However, for purposes of this discussion image 500 is a video image. However other images can be used. The image is defined by an image content. The image is presented to the content author through IDE 501.

Once image 500 has been loaded into IDE 501 at process 401 the author then obtains a mask 502 representative of a device group, such as device group 104 discussed above, that they wish to modify image 500 to display on. This is illustrated at process 402. In one embodiment, the mask 502 appears on IDE 501 centered on image 500. However, in other embodiments, the content author can pull mask 502 from one of tools 202-205 and place the mask on image 502 at any desired location in the image.

After the mask 502 has been placed on image 500 the content author can then manipulate the location of the mask on image 500 such that a desired image view can be obtained. This is illustrated at process 403. The manipulation of the mask can include such manipulations as zooming in on the image, moving the mask about the image, or any other manipulation that can be performed. Once mask 502 is in the desired location the content author can define a first cropped image content from the image content of image 500. For purposes of this discussion it will be assumed that image 500 is being cropped, however, other actions can be performed. This cropped image can be created by manipulating the mask (e.g. zooming, cropping, etc.) to produce edited image data 503. In the example illustrated in FIG. 5A, the content author is generating image content information from a video, image data 520, of a late night talk show. The host 510 is illustrated sitting at a desk on a right side of the image with a guest 512 sitting in a chair or on a couch on the left side of image. Based on the display properties of the device group represented by mask 502, the content author cannot show both the host, and the guest in the same frame without having to shrink (i.e., zoom out) the image. This shrinking of the image can result in unwanted bar lines or an unviewable image for the final image. Therefore, the content author at process 403 moves the mask over the portion of the image that is occupied by the host 510. At this process the author can also enlarge the image of the host so that the image does not appear to be cropped.

Next, the system automatically crops or otherwise edits the image data 520 based on the applied mask. This is illustrated at process 404. That is, as a result of the users manipulation of the image data 520 via application of mask 502 (e.g., placement of the mask 502 over the displayed image data 520, zooming in within the mask, zooming out with in the mask, etc.), the IDE automatically generates edited image data 503 corresponding to the resulting editing of image data 520 performed via such mask 502. The cropping of the image simply removes from the image content that portion of the image content that is not in the field of view of the mask. The cropped image content is stored in a storage unit, such as storage 514 at process 405 as a first cropped image.

Once the first cropped image content has been extracted from image 500 at process 404, the content author advances through each of the frames of the image video, to ensure that the mask is appropriate for each frame of the video. This is illustrated at process 406 as each frame advances IDE 501 causes a new cropped image to be stored for each frame. If during the review the frames, the location of the mask becomes undesirable (such as action elsewhere in the image), the author can move the mask in the frame to be located where the action is in the frame. This is illustrated at process 407. In the example above, assume the host has finished speaking, and now the guest is speaking. The author then moves mask 502 such that it is now located over the area of the image that has the guest. This moved mask is illustrated in FIG. 5B. Again at process 407, the author can make any necessary adjustments to the image to enhance the viewing image. This new image is edited and stored in storage 514 as a second cropped image. This is shown at process 408.

Following the generation of the second cropped image content from image 500, the author again monitors the video to determine if another change to the location of the mask is needed. If so the author repeats processes 406 to 408. This process continues until the image video has reached the end.

Once the image video has reached its end, the IDE accesses the cropped image data that has been stored in storage for each frame during the cropping process, and prepares to place it in an appropriate format for the devices in the device group. To determine the formats associated with each device in the device group that the cropped image video must be placed in, the IDE access a list of devices associated with the device group associated with the mask. From this list of devices, the IDE can create a version of the image video in the correct format for each of these devices such that the image video can be played on each device in the group. For example, the system would generate one file format that is configured for an LG mobile phone, and another file format that configured for a video monitor. This is illustrated at process 409.

The finished formatted file for each device are then stored in storage 516 for later retrieval and transmission to an associated device. In some embodiments, storage 514 and 516 are the same storage. This is illustrated at process 410. In some embodiments, the associated devices request the specific file format desired from storage 516. In these embodiments, the associated system provides the requested file to the device. In other embodiments, the system determines, based on information provided by the device what file format to provide to the device.

Figure 5A:
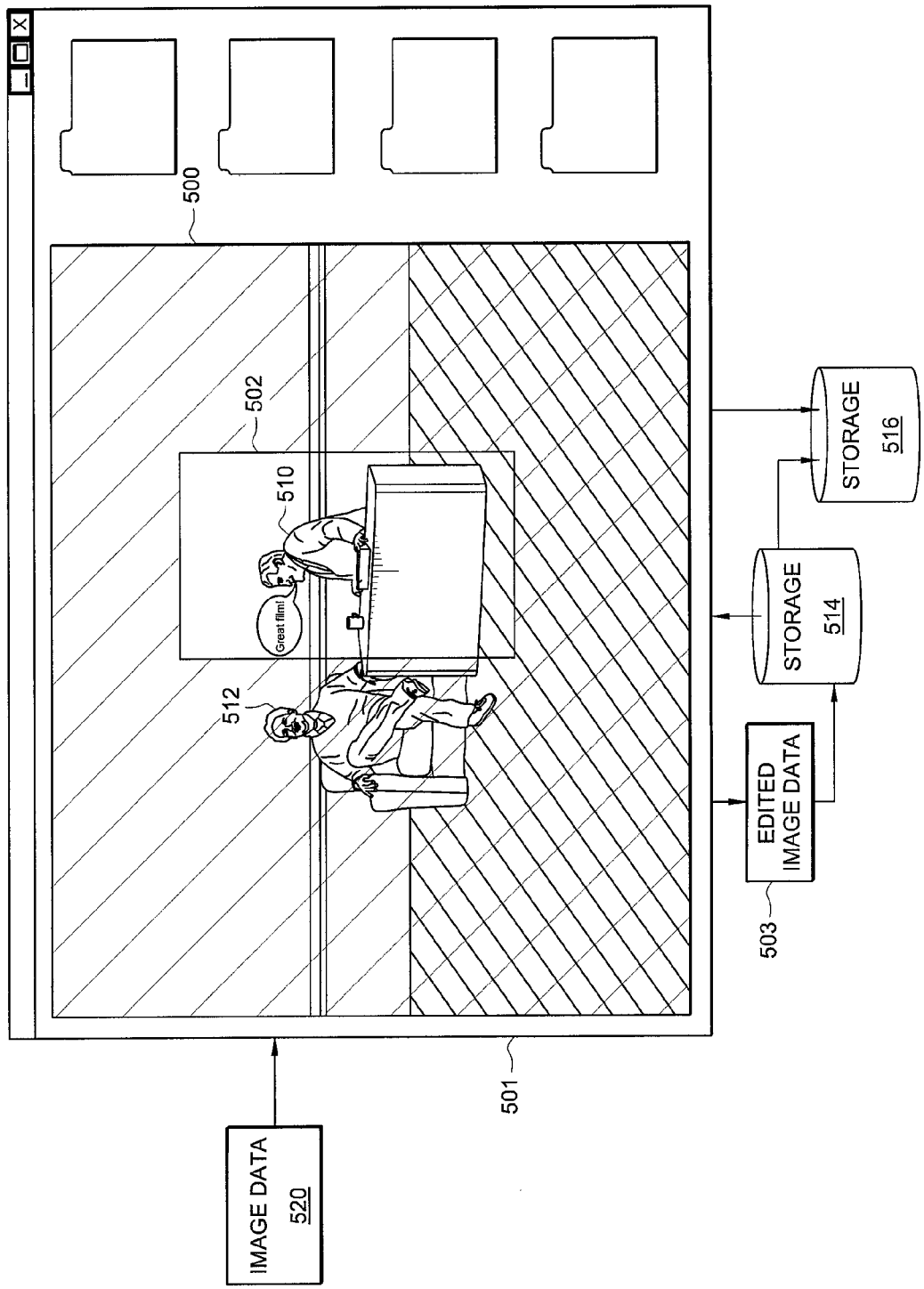
Figure 5B:
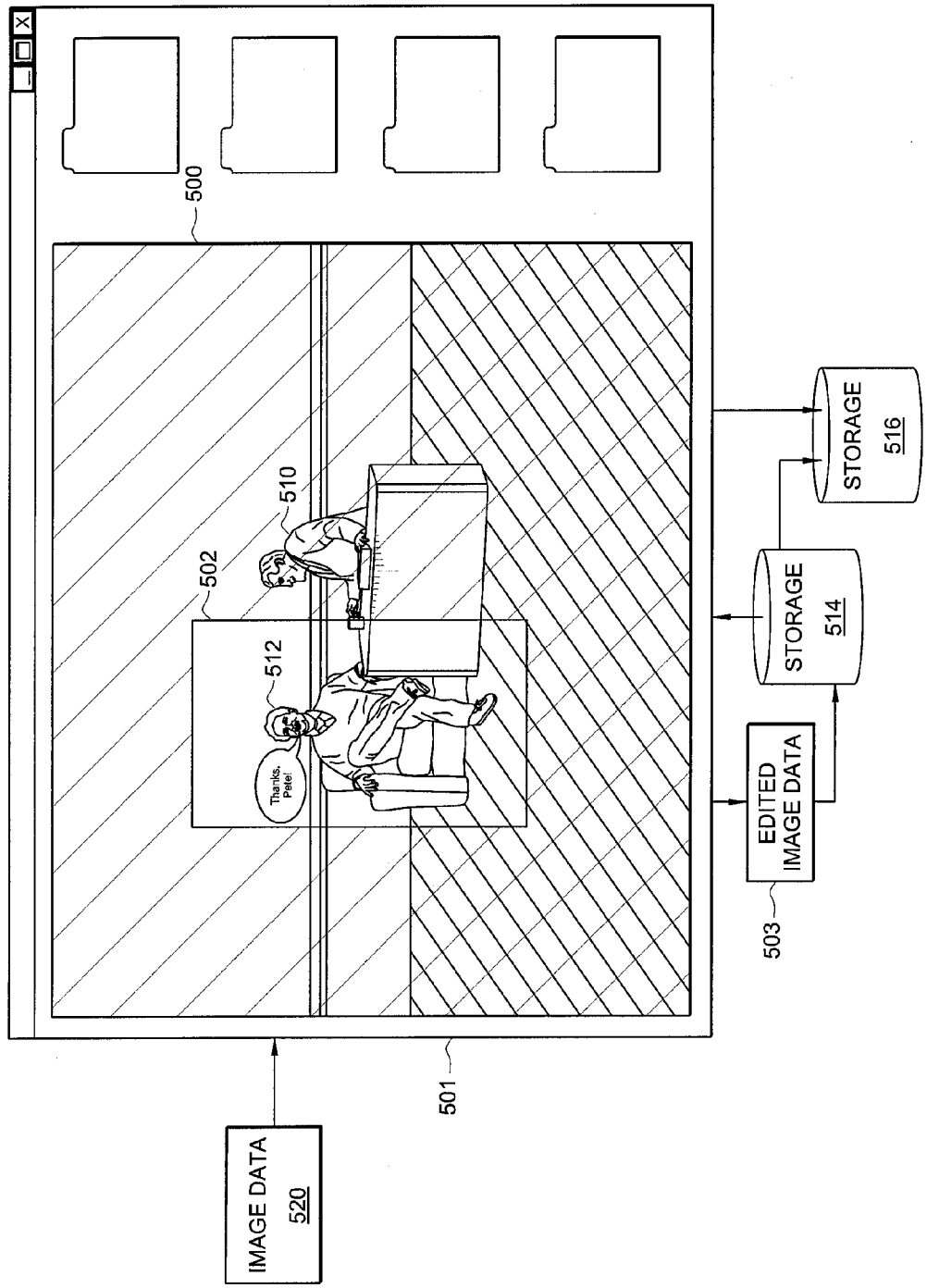
Figure 5C:
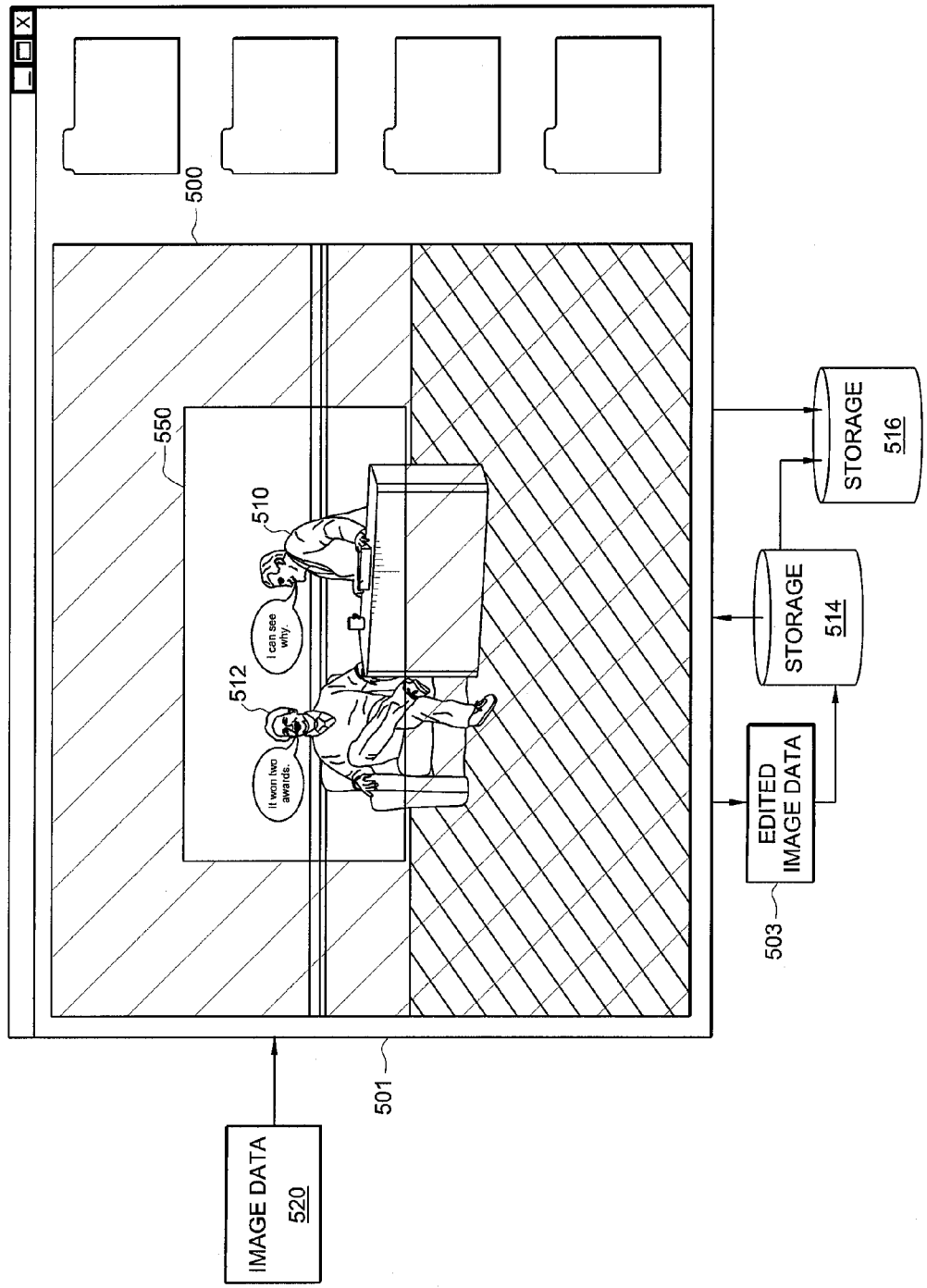
Figure 5E:
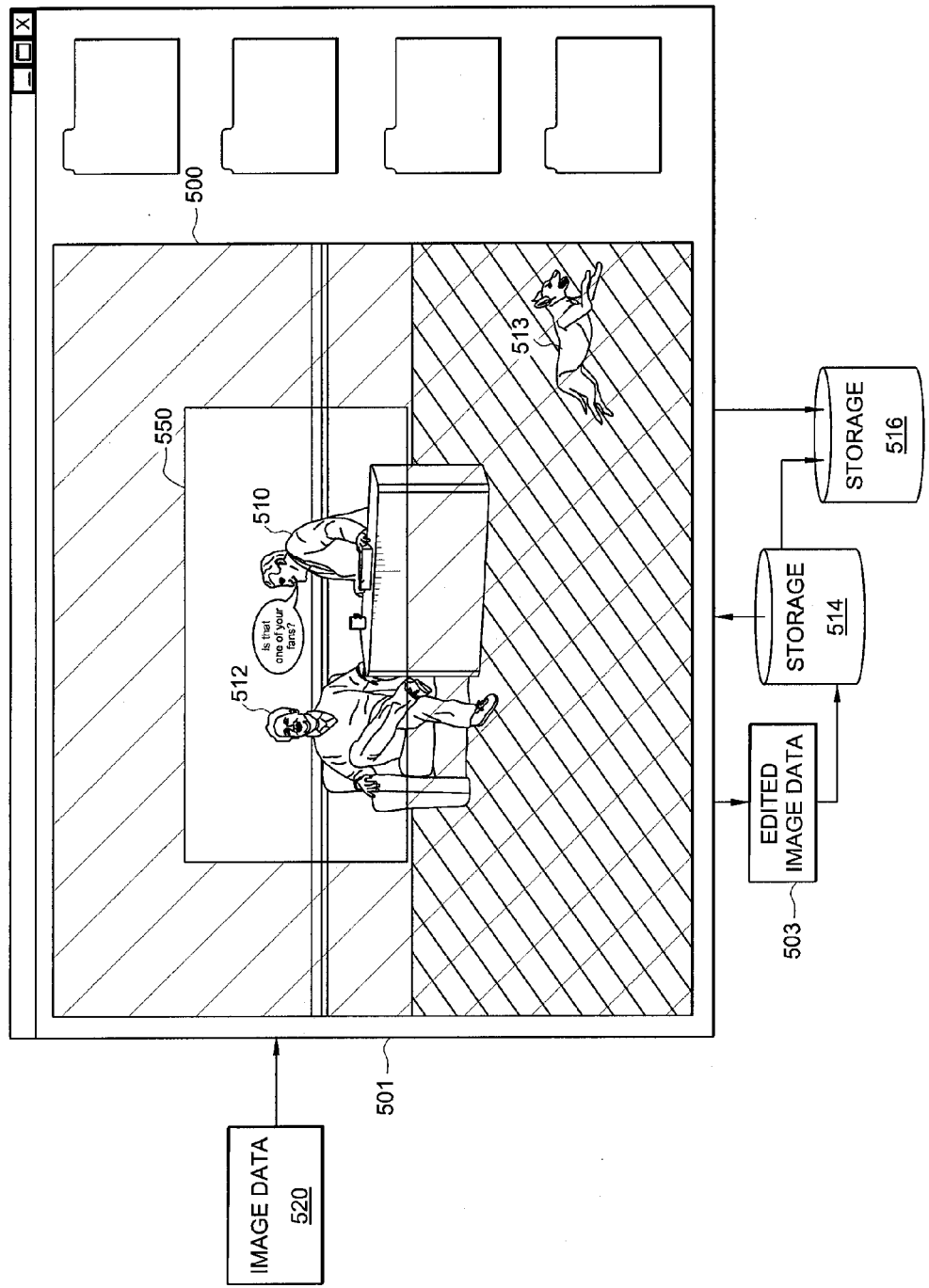

FIG. 5C illustrates the same image 500 as shown in FIG. 5A. FIG. 5C also, illustrates mask 550 displayed in IDE. Mask 550 represents the display properties of a second device group, such as device group 105. As the display properties of group 105 permit a wider field of view than shown in group 104, it is possible for mask 550 to remain in location longer than mask 502 as most of the action remaining in mask 550. However, for example, a dog 513 runs across the bottom of the image it may not be visible in mask 550, so the content author would move mask 550 to catch the dog moving across the screen. This movement of the mask is illustrated in FIG. 5D. Though now the heads of persons have been cut off so the author will need to return to the previous mask location. The return of mask 550 to the original location is shown in FIG. 5E.

Figure 5F:
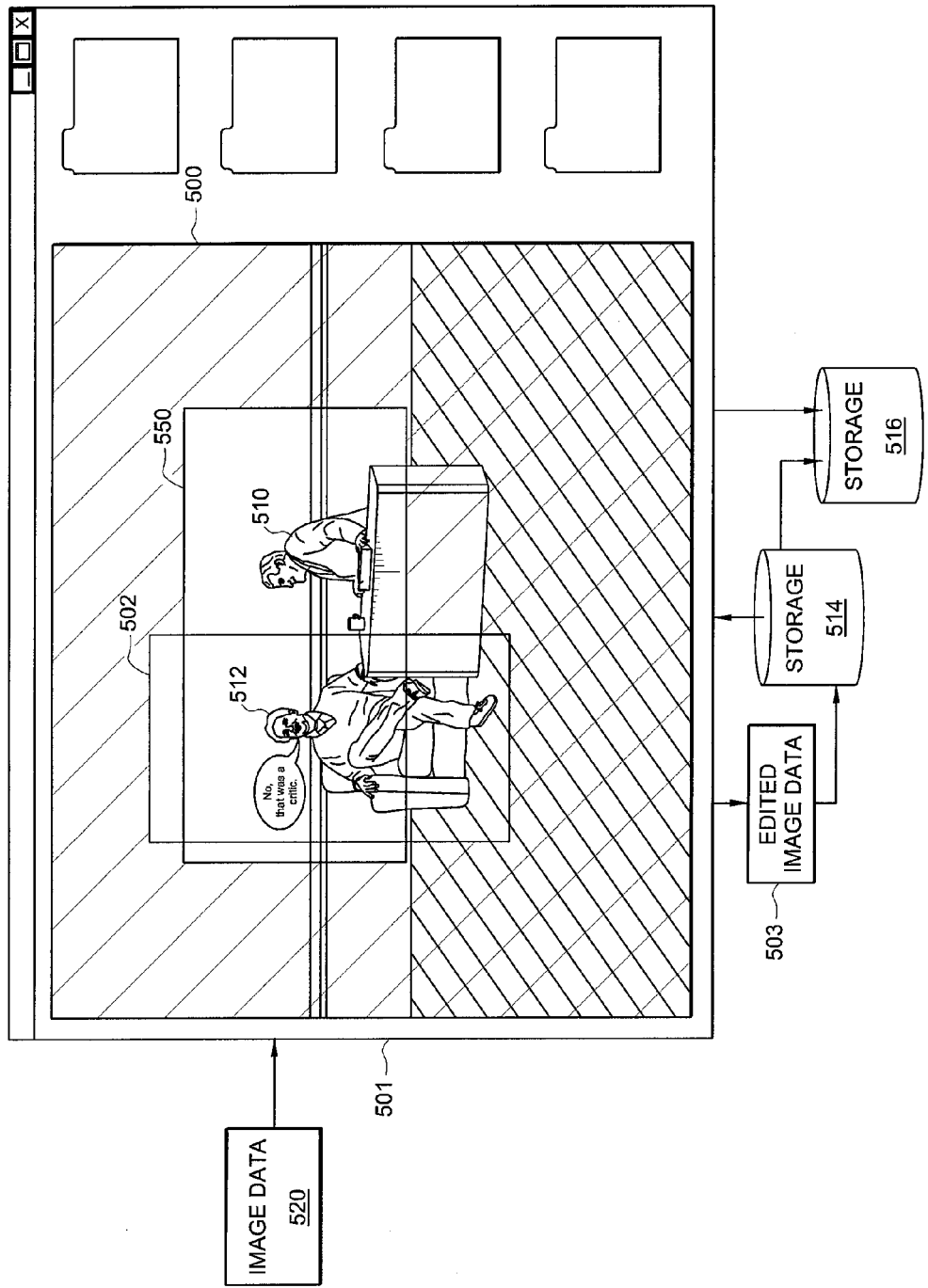
Figure 5G:
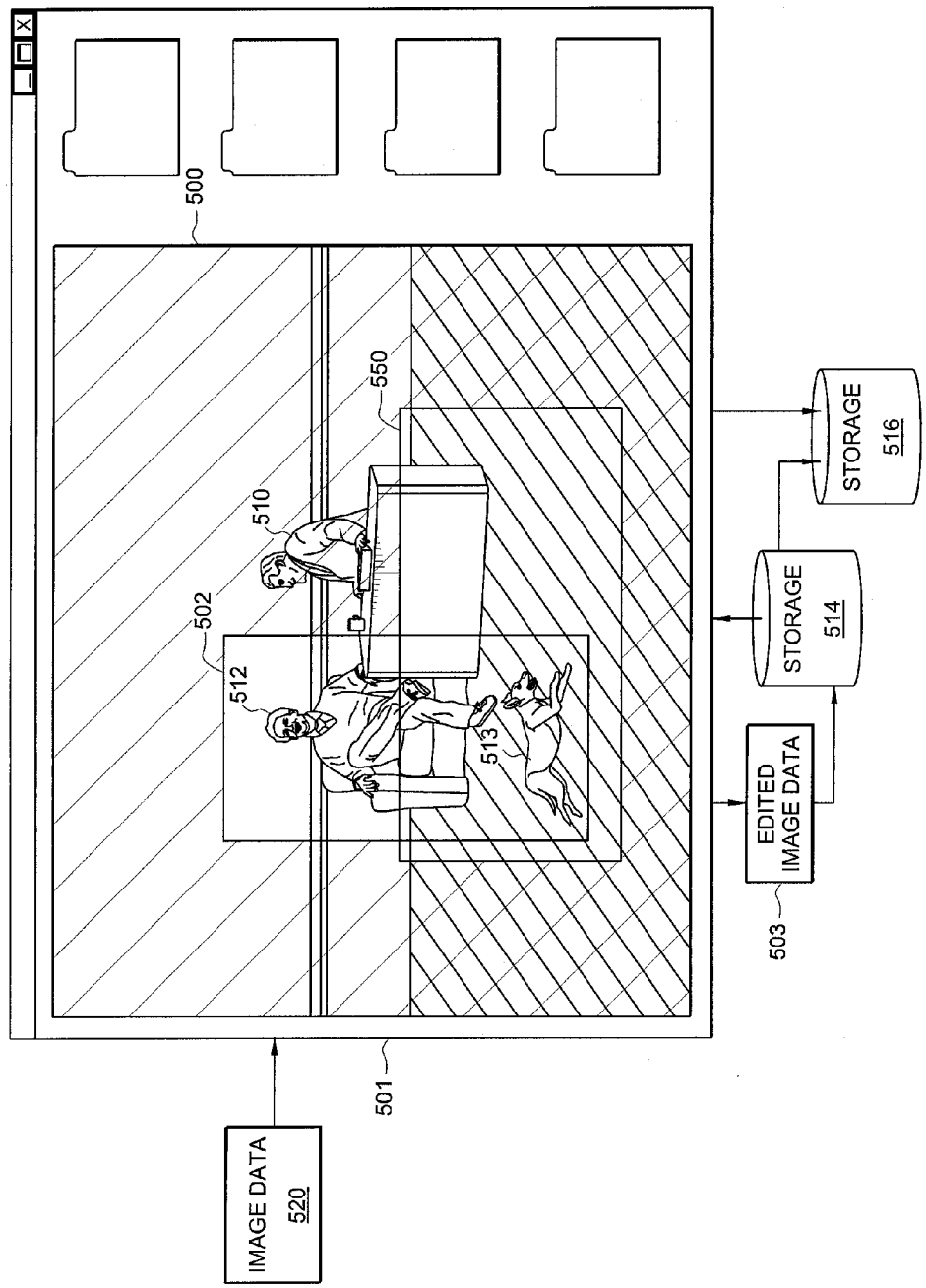
Figure 5H:
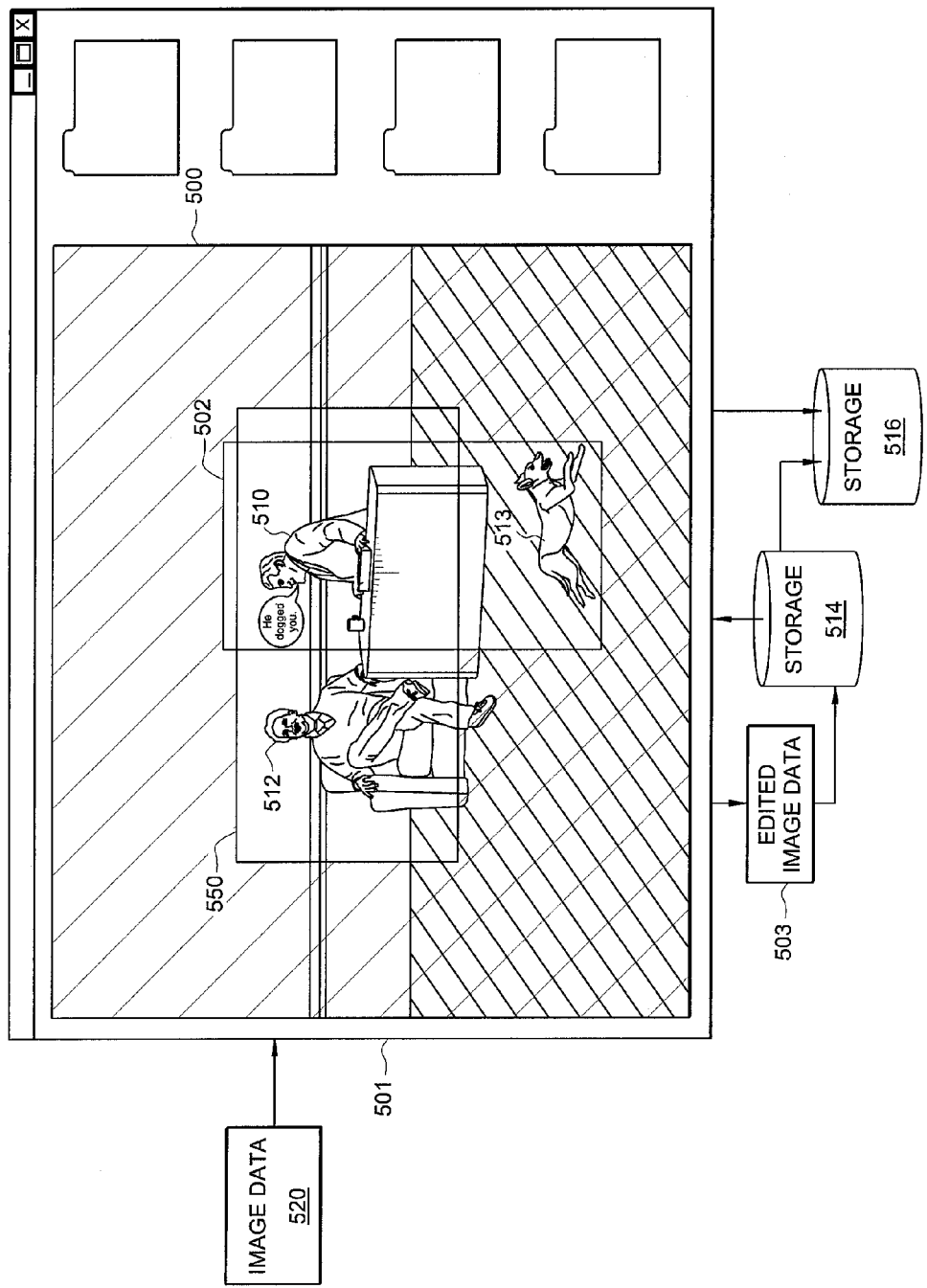

It should be noted that in some embodiments process 400 can be performed using multiple masks at one time. FIGS. 5F-5H illustrate a series of frames in image 500 using the multiple masks corresponding to FIGS. 5C-5E. Process 400 crops the image for each mask 502, 550 separately, but provides both masks on the display so that the author can see what is displayed on both device groups at once. This also helps to reduce the amount of time the author needs to spend on generating the various images.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 6:
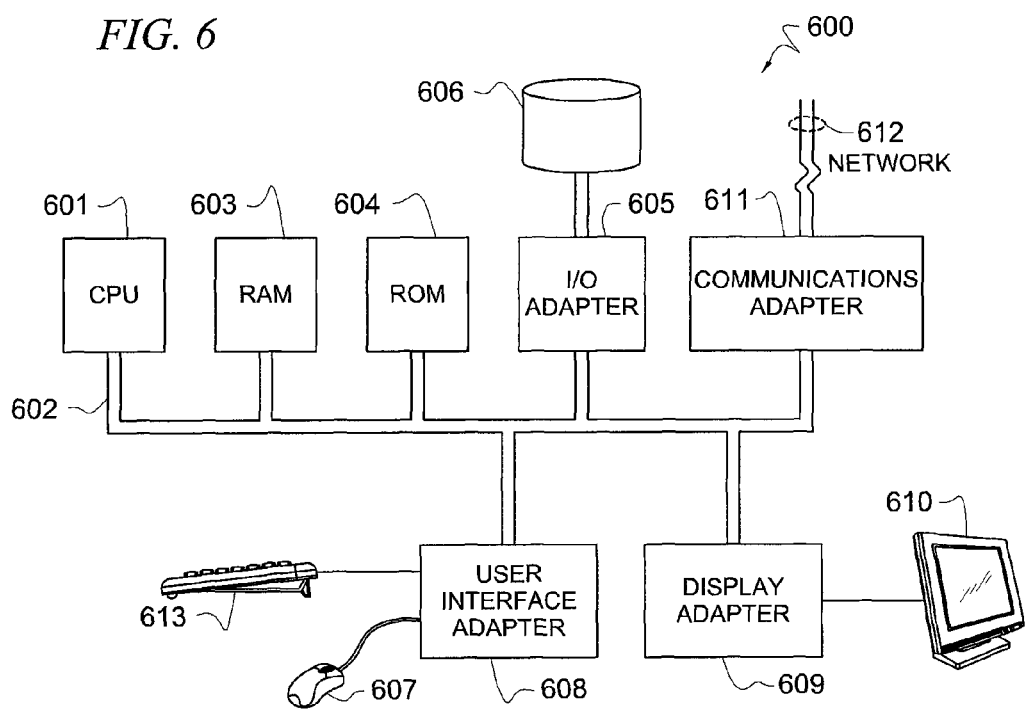
FIG. 6 shows a computer system adapted to use embodiments of the present invention.

FIG. 6 illustrates computer system 600 adapted to use embodiments of the present invention, e.g. storing and/or executing software associated with the embodiments. Central processing unit (CPU) 601 is coupled to system bus 602. The CPU 601 may be any general purpose CPU. However, embodiments of the present invention are not restricted by the architecture of CPU 601 as long as CPU 601 supports the inventive operations as described herein. Bus 602 is coupled to random access memory (RAM) 603, which may be SRAM, DRAM, or SDRAM. ROM 604 is also coupled to bus 602, which may be PROM, EPROM, or EEPROM. RAM 603 and ROM 604 hold user and system data and programs as is well known in the art.

Bus 602 is also coupled to input/output (I/O) controller card 605, communications adapter card 611, user interface card 608, and display card 609. The I/O adapter card 605 connects storage devices 606, such as one or more of a hard drive, a CD drive, a floppy disk drive, a tape drive, to computer system 600. The I/O adapter 605 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 611 is adapted to couple the computer system 600 to a network 612, which may be one or more of a telephone network, a local (LAN) and/or a wide-area (WAN) network, an Ethernet network, and/or the Internet network. User interface card 608 couples user input devices, such as keyboard 613, pointing device 607, and the like, to the computer system 600. The display card 609 is driven by CPU 601 to control the display on display device 610.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   receiving image data in a development tool executed by a processor of a computing device, the image data comprising a plurality of frames;
   applying, by the processor a purposing mask to a representation of said image data, wherein said purposing mask is representative of a group of second computing devices having a similar screen area, each of the second computing devices separate from the computing device executing the development tool;
   editing, by the processor, said image data based on said purposing mask to form a first edited image;
   storing, by the processor, said first edited image for later retrieval and display by at least one second computing device;
   advancing to a next frame in said plurality of frames;
   prior to editing said next frame, moving mask to a new location within said next frame in response to input;
   editing said next frame based on said purposing mask;
   storing said edited frame as a second edited image; and
   generating a plurality of formatted files for said stored first edited image and second edited image, each of said plurality of formatted files executable by a different one of the group of second computing devices.

2. The method of claim 1 wherein applying said purposing mask comprises:
   moving said purposing mask within said representation in response to input.

3. The method of claim 1 wherein editing comprises cropping said representation.

4. A non-transitory computer readable medium having computer executable instructions that when executed cause a computer to execute operations to:
   receive an image in an integrated development environment;
   display said image in said integrated development environment;
   display a plurality of purposing masks simultaneous to displaying said image, wherein each of said plurality of masks represents a different target format, each target format corresponding to at least one computing device separate from the computer executing the integrated development environment;
   apply a purposing mask to said image;
   edit said image based on said purposing mask; and
   store said edited image for later retrieval and display.

5. The computer readable medium of claim 4 wherein said image is a video image comprised of a plurality of image frames.

6. The computer readable medium of claim 5 further comprising instructions to:
   advance to a next frame in said plurality of image frames;
   edit said next frame based on said applied mask; and
   store said edited frame as a second edited image.

7. The computer readable medium of claim 4 further comprising instructions to:

generate a plurality of formatted files from said stored edited image.

8. The computer readable medium of claim 7 wherein said plurality of formatted files are displayable on a plurality of different devices separate from the computer executing the integrated development environment.

9. The computer readable medium of claim 4 wherein said edited image comprises:
a portion of said image.

10. A system comprising:
a processor; and
a memory,
wherein the memory embodies program code of a development tool, the program code comprising:
program code that configures the processor to simultaneously present an image and a plurality of masks, wherein each of said plurality of masks represents a different target format and comprises a translucent region surrounding a transparent region, said transparent region representing a viewing area of said target format, each target format corresponding to at least one computing device separate from the computing device executing the development tool;
program code that configures the processor to move a first mask, selected from said plurality of masks, relative to said presented image;
program code that configures the processor to edit said image to form a first edited image based on said first mask; and
program code that configures the processor to store said first edited image as first edited image data in a format readable by the computing devices corresponding to each target format.

11. The system of claim 10 wherein said program code that configures the processor to move configures the processor to position said first mask relative to the presented image.

12. The system of claim 10 wherein said program code that configures the processor to edit configures the processor to zoom in/out relative to said presented image.

13. The system of claim 10 wherein said program code that configures the processor to edit configures the processor to crop said presented image.

14. The system of claim 10, wherein said program code further comprises:
program code that configures the processor to advance to a next frame in said presented image;
program code that configures the processor to edit said next frame to form a second edited image; and
program code that configures the processor to store said second edited image as second edited image data in said format readable by said plurality of devices.

15. The system of claim 10, wherein said program code further comprises:
program code that configures the processor to move a second mask, selected from said plurality of masks and presented simultaneously with said first mask, relative to said provided image,
wherein the program code that configures the processor to edit said image configures the processor to form a second edited image based on said second mask, the second edited image different from the first edited image.

16. The system of claim 10, wherein the program code that configures the processor to store said first edited image comprises code that configures the processor to store said first edited image in a plurality of different formats, each format corresponding to one of the computing devices.

17. The system of claim 16, wherein the program code further comprises:
program code that configures the processor to send said first edited image data to a first target computing device in a format associated with said first target computing device.

18. The system of claim 16, wherein the program code further comprises:
program code that configures the processor to respond to a request from a first target computing device for image data by providing to said first target computing device said first edited image data in a format associated with said first target computing device.

* * * * *

UNITED STATES PATENT AND TRADEMARK OFFICE
CERTIFICATE OF CORRECTION

| | | |
|---|---|---|
| PATENT NO. | : 8,005,316 B1 | |
| APPLICATION NO. | : 11/749565 | |
| DATED | : August 23, 2011 | |
| INVENTOR(S) | : Carol Linburn et al. | |

It is certified that error appears in the above-identified patent and that said Letters Patent is hereby corrected as shown below:

Column 12, Line 28 (Claim 1, Line 17)
Insert --said purposing-- following the word *moving*

Signed and Sealed this
Eighteenth Day of October, 2011

David J. Kappos
*Director of the United States Patent and Trademark Office*